United States Patent
Kelly et al.

[11] Patent Number: 6,020,695
[45] Date of Patent: Feb. 1, 2000

[54] THREE-PHASE GENERATOR BOOST CIRCUIT

[75] Inventors: David W. Kelly, Lino Lakes; Michael J. Peterson; Jason P. Brenden, both of Eagan, all of Minn.

[73] Assignee: VTC Inc., Bloomington, Minn.

[21] Appl. No.: 09/360,360

[22] Filed: Jul. 23, 1999

Related U.S. Application Data

[60] Provisional application No. 60/120,860, Feb. 19, 1999.

[51] Int. Cl.[7] .................................................. H02P 7/67
[52] U.S. Cl. ........................... 318/49; 318/254; 318/439; 318/138; 318/798; 318/34
[58] Field of Search .................................... 318/254, 439, 318/138, 49, 798, 34

[56] References Cited

U.S. PATENT DOCUMENTS

| | | |
|---|---|---|
| 5,473,725 | 12/1995 | Chen et al. .............................. 318/254 |
| 5,495,372 | 2/1996 | Bahlmann et al. ........................ 360/75 |
| 5,504,402 | 4/1996 | Menegoli ................................ 318/377 |
| 5,506,487 | 4/1996 | Young et al. ............................ 318/811 |
| 5,949,204 | 9/1999 | Huggett et al. .......................... 318/254 |

Primary Examiner—Karen Masih
Attorney, Agent, or Firm—Kinney & Lange

[57] ABSTRACT

A three-phase generator boost circuit for augmenting the back electromotive force produced by a spindle motor of a disk drive is disclosed. First and second nodes provide normal connection to a source of DC voltage for the spindle motor and a second motor connected between the first and second nodes. A commutator is connected to a sequencer to operate the spindle motor. In the event of catastrophic shutdown, two of the lower commutator switches are operated to short circuit the two stator coils having the highest and lowest voltages to store energy in the coils. The commutator switches are then operated to discharge current through the nodes to a storage capacitor for the second motor.

25 Claims, 1 Drawing Sheet

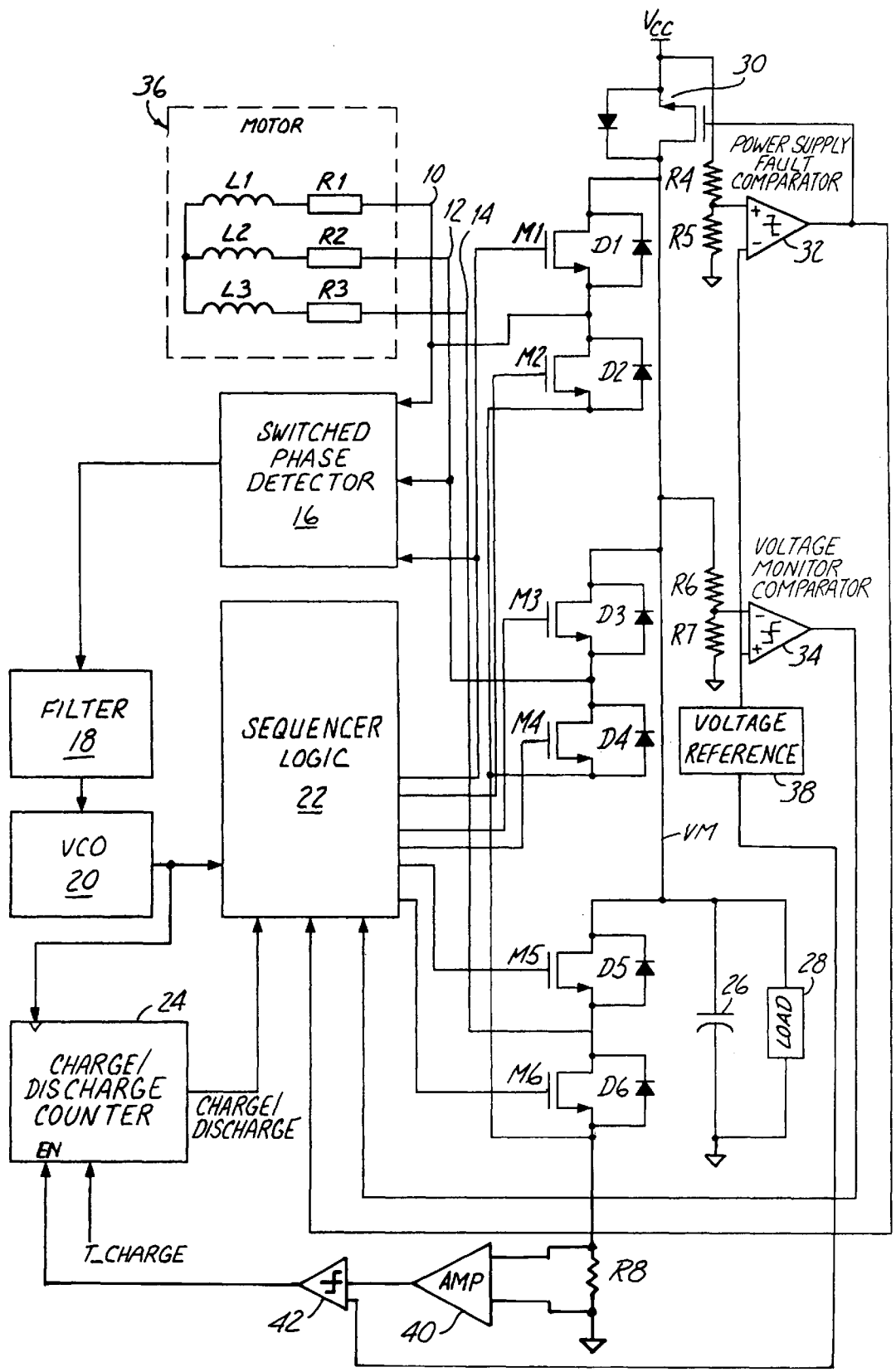

THREE-PHASE GENERATOR BOOST CIRCUIT

CROSS-REFERENCE TO RELATED APPLICATION(S)

This application claims priority of U.S. Provisional Application Ser. No. 60/120,860 filed on Feb. 19, 1999, for "3-Phase Generator Boost Circuit" by David Kelly et al.

BACKGROUND OF THE INVENTION

As the evolution of computers has progressed, so has the evolution of hard disk drives. The vast majority of hard disk drives are now manufactured with "flying" heads attached to an actuator arm. The "flying" head consists of a slider supporting write and read heads to write data to and read data from an adjacent disk over which the slider flies. Also associated with "flying" head are parking zones. Parking zones allow the "flying" head to be safely landed after the hard drive has ceased operation. During the power down stage of a hard disk drive, the flying head is moved to a parking zone before the hard disk drive stops spinning. Otherwise the head will land outside the parking zone, potentially damaging the disk.

The parking zone on a hard disk drive varies depending on the type of disk drive present. In some disk drives the designated parking zone is located on the disk, usually at the innermost track on the disk. More recently, parking zones have included ramps to raise the flying head and park it off the disk in an elevated position. The ramp is usually located at the outermost edge of the disk. During the power down stage, the actuator arm is moved to the outermost edge of the disk and up the ramp to the parking zone. The ramp parking zone offers certain advantages over disk parking zones because it does not waste valuable disk space, avoids problems of stiction between the head and disk, and reduces wear on the head due to disk contact, thus improves reliability of the disk drive.

When a disk drive is powered down, it usually performs certain operations before actually disconnecting from the external power source. One of these power down operations is to operate the actuator arm to move the head to the parking zone. However, in the event of a catastrophic shut down (i.e. external power is suddenly removed) there is no external power to perform power down procedures, including to move the head to the parking zone. Typically, the momentum of the spinning disk operates the spindle motor to generate a back electromotive force (BEMF) at the motor terminals, which is rectified and stored in a capacitor to provide power to the actuator control circuitry upon a catastrophic shut down. However, the voltage available to power the actuator is limited by the BEMF of the motor.

Bahlmann et al. (in U.S. Pat. No. 5,495,372) increases the voltage by short circuiting the motor inductance to charge the capacitor. As a result, Bahlmann et al. increases the voltage available to provide a low power to the actuator, which is sufficient for some disk drive systems. However, the Bahlmann et al. circuit does not provide sufficient power to operate the actuator up the ramp. Menegoli (in U.S. Pat. No. 5,504,402) improves upon Bahlmann et al. by monitoring and controlling the motor current to generate a higher current for operation of the actuator motor. Menegoli extracts power from the spinning motor by opening all commutator switches and short circuiting the stator coils through an additional switch in parallel with the commutator switch pairs. BEMF voltage is pulled through the inherent diode associated with the open upper switch associated with the terminal having the highest voltage. Alternatively, Menegoli operates the commutator's upper switches to eliminate the diode drop associated with upper switch inherent diodes. In either case, the Menegoli approach requires additional circuitry which must be powered by the BEMF during the catastrophic condition. Menegoli additionally requires that the storage capacitor be charged through at least one series diode to isolate the shorting switch from the load; the diode significantly reduces the power conversion efficiency.

BRIEF SUMMARY OF THE INVENTION

A three-phase generator boost circuit is provided for a hard disk drive having a spindle disk and a flying head. The three-phase generator boost circuit augments the back electromotive force produced by the spindle disk, and uses this augmented back electromotive force to move the flying head up a ramp during the power down stage of a hard disk drive.

In a preferred form of the invention, a commutator is connected to receive power through first and second nodes connected to a source of DC voltage, with the three stator coils of a first three-phase motor connected to the commutator. A second motor is connected between two nodes and also operable by the source of DC voltage. A sequencer is connected to the commutator to operate in either of two modes, the first mode being to operate the commutator switches to provide power from the source of DC voltage to the three stator coils to operate the first motor, and a second mode discharge back emf from the stator coils to supply power to the second motor.

In the second mode, the sequencer operates the commutator switches to serially short circuit two stator coils through one of the nodes during a first portion of the 60° phase that the coils have the highest and lowest voltages. The sequencer then operates the commutator switches so that energy stored in the stator coils is discharged during a second portion of the 60° phase to charge a storage capacitor associated with the second motor.

In one form of the invention, a current sensor senses discharge current from the motor and operates the sequencer to again short circuit the stator coils if the current is below a threshold.

In preferred embodiments, the current is discharged through inherent diodes of the commutator switches to charge the capacitor. In other embodiments, the upper commutator switch associated with the stator coil having the highest voltage and the lower commutator switch associated with the stator coil having the lowest voltage are operated to charge the capacitor.

BRIEF DESCRIPTION OF THE DRAWINGS

The sole drawing is a schematic diagram of one preferred embodiment of a three-phase generator boost circuit for boosting the back electromagnetic force produced by a spindle disk in a hard disk drive.

DETAILED DESCRIPTION

The drawing shows a three-phase motor 36 having a first stator winding L1, a second stator winding L2, and a third stator winding L3, each having internal resistors R1, R2 and R3 and connected by respective terminals 10, 12 and 14 to a switched phase detector 16. Motor 36 is a spindle motor of a disk drive for rotating the disk media of the drive. Switched phase detector 16 provides an output through filter 18 and voltage controlled oscillator 20 to sequencer logic device 22. Charge counter 24 also provides a logic input to sequencer 22. First stator winding 10, second stator winding 12, and third stator winding 14 are all connected to a single center tap within motor 36. Switched phase detector 16 detects the 60° undriven phase relative to the average of the three windings and provides phase information to sequencer logic 22. Voltage controlled oscillator (VCO) 20 regulates the frequency of signals sent to sequencer logic 22. Sequencer logic 22 is connected to charge counter 24 to operate switches M1–M6 which together form a commutator for motor 36.

Commutator switches M1–M6 are MOSFETs. Sequencer logic 22 is connected to the gates of switches M1–M6 to operate the commutator in one of two modes. In a first mode, the commutator provides power from source $V_{cc}$ to terminals 10, 12 and 14 of motor 36. In a second mode, the commutator drains back electromagnetic force (BEMF) from the spindle motor during a catastrophic power shut down to provide power to load 28, such as the voice coil motor of an actuator arm supporting a flying head. Capacitive element 26 is connected between voltage node VM and a common electrical potential, such as ground. Capacitive element 26 stores the charge at voltage node VM. Load 28 is connected between voltage node VM and ground.

Power supply fault comparator 32 is an operational amplifier with its output terminal connected to the gate of motor isolation switch 30 and to sequencer logic 22, its positive input terminal connected between resistors R4 and R5 and its negative input terminal connected to voltage reference 38. Resistors R4 and R5 are connected between the supply voltage, $V_{cc}$, and ground. Power supply fault comparator 32 detects whether the power supply, $V_{cc}$, is above a threshold established by the voltage divider of resistors R4 and R5. Motor isolation switch 30 is an NMOSFET having its gate connected to the output of power supply fault comparator 32, its source connected to a common electrical potential, $V_{cc}$, and its drain connected to voltage node VM. Motor isolation switch 30 is responsive to the output from power supply fault comparator 32 to provide power from the source $V_{cc}$ to bus VM to operate motors 28 and 36 when $V_{cc}$ is present, and to isolate bus VM from the source when $V_{cc}$ is not present, thereby preventing power from the BEMF voltage from being diverted to other parts of the disk drive. Additionally, comparator 32 operates sequencer 22 to its first or second mode, depending on whether $V_{cc}$ is on or off.

Voltage monitor comparator 34 is an operational amplifier with its output terminal connected to sequencer logic 22, its negative input terminal connected between resistors R6 and R7 and its positive input terminal connected to voltage reference 38. Resistors R6 and R7 form a voltage divider between node VM and ground so that comparator 34 compares the voltage at node VM to voltage reference 38. When the voltage at node VM falls below a threshold voltage, voltage monitor comparator 34 operates sequencer logic 22 to begin charging and discharging the motor inductances using the commutator to bring the voltage at node VM back up to a normal operating voltage.

Resistor R8 senses motor current through the respective commutator switches M1–M6 during charging of capacitor 26 from the BEMF voltage, and supplies a voltage representing motor current through amplifier 40 to current sense comparator 42. Comparator 42 compares the voltage representative of motor current to reference voltage 38 representing a minimum operation current during catastrophic shutdown and provides an enable signal to charge counter 24.

When the commutator is operated in a first mode (normal disk drive operation), power is supplied at $V_{cc}$ through switch 30 to operate sequencer 22 to the first mode. Sequencer 22 operates the commutator switches M1–M6 to apply power from supply $V_{cc}$ to operate the spindle motor 36 in the normal operational mode of the motor to rotate the disks (not shown) attached to the motor. Also, $V_{cc}$ is applied through switch 30 to operate motor 28. During normal operation, the upper switches, M1, M3 and M5, are operated during mutually exclusive 120° phases and the lower switches, M2, M4 and M6 are operated during a second set of mutually exclusive 120° phases. The two phases sets are offset, so that during each 60° phase, a different pair of switches are operated to apply $V_{cc}$ to a terminal at one stator coil and ground at a terminal of another stator coil. The timing sequence of operation of switch M1–M6 is illustrated in Table I.

TABLE I

POWERING MOTOR 36

| Phase | High Voltage Winding | Low Voltage Winding | Stator Charged |
| --- | --- | --- | --- |
| 0–60 | M3 (Terminal 12) | M2 (Terminal 10) | L1, L2 |
| 60–120 | M5 (Terminal 14) | M2 (Terminal 10) | L1, L3 |
| 120–180 | M5 (Terminal 14) | M4 (Terminal 12) | L2, L3 |
| 180–240 | M1 (Terminal 10) | M4 (Terminal 12) | L1, L2 |
| 240–300 | M1 (Terminal 10) | M6 (Terminal 14) | L1, L3 |
| 300–360(0) | M3 (Terminal 12) | M6 (Terminal 14) | L2, L3 |

Thus, as shown in the power chart above, during the first 120° terminal 10 has the lowest voltage of the three terminals, during the second 120° terminal 12 has the lowest voltage, and during the third 120° terminal 14 has the lowest voltage. Similarly, during the first 60° terminal 12 has the highest voltage, during the next 120° terminal 14 has the highest voltage, during the next 120° terminal 10 has the highest voltage, and during the last 60° terminal 12 has the highest voltage. The BEMF of the undriven phase is gated through with or without inversion as necessary to maintain a uniform phase detector transfer function by phase detector 16. Phase detector 16 is part of a phase locked loop which enables the drivers to provide maximum motor torque in the correct direction at the appropriate times.

In the normal (non-catastrophic) shutdown of the drive, motor 36 is shut down through the commutator, but the $V_{cc}$ source remains applied through switch 30 to actuator arm motor 28. Motor 28 is operated to move the actuator arm to the parking zone, including up any ramp, in a manner well known in the art. However, if power is removed, such as by a catastrophic shut down, source $V_{cc}$ is not available to operate motor 28 to move the actuator arm to the parking zone. The present invention employs the rotational momentum of the disks connected to motor 36 to generate a BEMF which is employed to operate motor 28.

When power is catastrophically removed, causing removal of power from bus VM, the rotational momentum of the disk causes motor 36 to continue rotating, generating a BEMF voltage at each of the three terminals 10, 12 and 14 of the motor. The BEMF voltages at the three terminals have the general shape of three sinusoids which are displaced by 120° relative to each other. Thus, a terminal 10, 12 or 14 will have the highest BEMF voltage for a 120° phase, and a different terminal 10, 12, or 14 will have the lowest BEMF voltage for a 120° phase. For example, during a first 60° phase, terminal 12 may have the highest BEMF voltage and terminal 10 may have the lowest BEMF voltage, during the next 60° phase terminal 14 may have the highest BEMF voltage and terminal 10 may still have lowest BEMF voltage, during the next 60° phase terminal 14 may still have the highest BEMF voltage and terminal 12 may have lowest BEMF voltage, and so on as shown in Table I. The present invention accomplishes extraction of maximum BEMF power by short circuiting the two terminals displaying the highest and lowest BEMF voltage through two of the lower switches M2, M4 and M6, and then extracting power from the motor through the upper diode D1, D3 or D5 associated with the terminal having the highest voltage and the lower diode D2, D4 or D6 associated with the terminal having the lowest voltage.

Upon a catastrophic shutdown, voltage monitor comparator 34 senses a low voltage condition, thereby operating sequencer 22 to the second mode to generate power from the BEMF of motor 36. In the preferred embodiment, the sequencer operates two lower commutator switches (as selected by the sequencer logic) to short two windings of the motor. Charge counter 24 counts clock cycles from VCO 20 to a maximum count established by T_charge, and then operates sequencer 22 to open or turn off both switches and remove the short circuit from the motor windings. The BEMF voltage supplies a current through the upper diode D1, D3 or D5 associated with the winding having the highest voltage and the lower diode D2, D4 or D6 associated with the winding having the lowest voltage to charge capacitor 26.

During the period of time that the two lower commutator switches short circuit the motor windings, the motor current ΔI will increase by an amount proportional to the motor inductance and resistance, the BEMF, and the charge time established by counter 24 and be stored in the shorted motor windings. The BEMF and VCO frequency will both drop linearly as the motor speed decreases. Therefore, the charge time established by counter 24 will increase, keeping ΔI approximately constant for each charge interval. (A slight decrease in ΔI will occur due to the motor winding resistance).

The shorting lower commutator switches remain on for the period of time established by counter 24 counting VCO pulses to the count established by T_charge. Then the commutator switches are turned off by sequencer 22. When the commutator switches are off, the power stored in the inductance of the two previously-shorted windings due to current ΔI is discharged through the upper diode D1, D3 or D5 associated with the highest BEMF voltage into storage capacitor 26 to ground, and thence from ground through current sense resistor R8 and the lower diode D2, D4, or D6 associated with the lowest BEMF voltage. The current thus charges capacitor 26. If the charge current through resistor R8 is less than the minimal operation current set by current sense comparator 42, counter 24 operates sequencer 22 to again operate the commutator switches to further increase the current. Preferably, a minimum off time is programmed into counter 24 to allow the circuits to settle and properly sense the current through resistor R8 for comparison to the minimal operation current.

If the current through resistor R8 is greater than the minimal operation current, the current is allowed to flow into and charge capacitor 26 until the current through resistor R8 falls below the minimal operation current. If voltage comparator 34 still senses a low condition when the current through resistor R8 falls below the minimal operation current, sequencer 22 operates the lower commutator switches on again. Under heavy load, where voltage monitor comparator 34 continuously detects a low voltage condition, the circuitry of the present invention will maintain the motor current above the minimum operation current as long as the disk is spinning and BEMF is generated by the rotating motor 36.

TABLE II

| | CHARGE BOOST | | | |
|---|---|---|---|---|
| | Shorting Switches | | Charging Diode | |
| Phase | High | Low | High | Low |
| 0–60 | M4 | M2 | D3 | D2 |
| 60–120 | M6 | M2 | D5 | D2 |
| 120–180 | M6 | M4 | D5 | D4 |
| 180–240 | M2 | M4 | D1 | D4 |
| 240–300 | M2 | M6 | D1 | D6 |
| 300–360(0) | M4 | M6 | D3 | D6 |

The commutator switches M2, M4 or M6 are operated during the period established by the count of T_charge and the frequency of VCO 20, and are operated in the sequence as illustrated in Table II. Thus, during the 60° phase when terminal 12 is the high voltage terminal and terminal 10 is the low voltage terminal, MOSFETs M4 and M2 are operated during the portion of that phase established by T_charge to generate energy that is stored in windings L2 and L1. Likewise, during the portion established by T_charge of the next 60° phase when terminal 14 is the high voltage terminal and terminal 10 is the low voltage terminal, MOSFETs M6 and M2 are operated to generate energy that is stored in windings L3 and L1. The procedure continues as outlined in Table II through the commutator, operating two lower switches through the 360° operation of the motor.

During the same 60° phases, and following opening of the respective lower commutator switches M2, M4 and M6, the power stored in the respective windings is discharged through a respective upper and lower inherent diode D1–D6, until the current through resistor R8 falls to below the minimum operation current established by reference 38 and comparator 42. More particularly, when the lower shorting switches are turned off or opened, the magnetic field resulting from current flow in the motor inductance during short circuit collapses, causing the voltage across the inductors to rise until the motor terminal of the high voltage winding exceeds the voltage necessary to forward bias the body diode of the appropriate upper commutator switch M1, M3 or M5 and the terminal of the low voltage winding is below ground potential to forward bias the body diode of the appropriate lower commutator switch M2, M4, or M6. At that time, the corresponding inherent diode turns on and current flows from ground into VM through the two diodes, until the two previously-shorted inductors have discharged enough that the voltage at the high terminal falls to below one diode drop above the voltage at VM. Thus, during the 60° phase when terminal 12 is the high voltage terminal and terminal 10 is the low voltage terminal, after the short circuit operation and MOSFETs M4 and M2 become open or non-conducting, the energy stored in coils L2 and L1 is discharged through inherent diode D3, capacitor 26, resistor R8 to ground and back through inherent diode D2 to charge capacitor 26 until the current through resistor R8 drops below the minimum operation current. Likewise, during the portion of the next 60° phase when terminal 14 is the high voltage terminal and terminal 10 is the low voltage terminal, and after the short circuit operation and MOSFETs M6 and M2 become non-conducting, the energy stored in coils L3 and L1 is discharged through inherent diode D5, capacitor 26, resistor R8 to ground and back through inherent diode D2 to charge capacitor 26. The procedure continues as outlined in Table II through the commutator, through the 360° operation of the motor.

As described above, the charging of capacitor 26 occurs through two diodes, one upper and one lower. Another embodiment of the present invention eliminates the diode drops by operating the corresponding upper and lower commutator switch to charge capacitor 26 through the commutator rather than through the diodes. Thus, with reference to Table II, during the 60° phase when terminal 12 is the high voltage terminal and terminal 10 is the low voltage terminal, MOSFETs M4 and M2 are operated to short circuit windings L2 and L1 as described above. After MOSFETs M4 and M2 are opened or turned off, sequencer logic 22 operates MOSFETs M3 and M2 to charge capacitor 26. The charging of capacitor 26 is in the manner described above, except that the charging eliminates the diode drops previously associated with inherent diodes D3 and D2. Similarly, during the next 60° phase when terminal 14 is the high voltage terminal and terminal 10 is the low voltage terminal, MOSFETs M6 and M2 are operated to short circuit windings L3 and L1 as described above. After MOSFETs M6 and M2 are opened or turned off, sequencer logic 22 operates MOSFETs M5 and M2 to charge capacitor 26.

Another embodiment of the present invention simplifies the switching sequence of the commutator switches by holding on or conducting the lower switch M2, M4, or M6 associated with the lowest voltage for the entire 60° phase, and pulsing at least the upper, and preferably also the lower, switch associated with the highest voltage to store energy in the windings and discharge the energy into capacitor 26. For example, referring to Table II, MOSFET M2 may be operated on for the first 60° phase. MOSFET M4 is operated during a portion of that phase to store energy due to the BEMF and store it in windings L1 and L2, and MOSFET M3 is operated during a subsequent portion of the same 60° phase to discharge current into capacitor 26. During the next 60° phase, MOSFET M2 is operated and MOSFETs M4 and M3 are pulsed on. It will be appreciated that because a winding terminal is at the lowest voltage for a 120° interval, the lower MOSFET (MOSFET M2 in the example just given) is actually operated for a full 120° interval (two consecutive 60° phases) while the MOSFETs associated with other two windings are pulsed during respective 60° phases.

Operating the commutator switches to deliver current to the capacitor increases the efficiency of discharge of motor inductance by eliminating the diode drop on the low voltage terminal. However, if the phase locked loop of phase detector 16 were to have a large phase error due to some unforeseen system transient, the motor current could rise above the intended target current. For example, if the phase locked loop was 180° out of phase with the motor, the highest terminal would be held on and the lowest terminal would be pulsed. In this case, current would recirculate through the lower MOSFET of the lowest terminal and the lower diode of the highest terminal, and no current will flow through the sense resistor R8. Thus, if the motor were 180° out of phase with the sequencer, during the first 60° phase of the sequencer shown in Table II, terminal 10 would be high (instead of low) and terminal 12 would be low (instead of high), and current would flow out of terminal 10 into ground through MOSFET M2, and would flow into terminal 12 from ground through inherent diode D4. As a result, the motor current would increase well above the intended operating level, leading to potential component failure.

The preferred embodiment is to pulse the lower switch of both the high and low voltage terminals on and off simultaneously to build charge into the appropriate winding and turning off all switches to charge the capacitor. By turning both devices off, current is guaranteed to flow through sense resistor R8 to be sensed by amplifier 40. While the preferred embodiment introduces an additional diode voltage drop during the discharge phase, it eliminates the possibility of a catastrophic failure if the phase locked loop was to get out of phase with the motor. Moreover, the efficiency cost of a diode drop during the inductance discharge phase is much less than during the charging phase, so the sacrifice due to the diode drop is minimal; the operation of the circuit during the inductance-charging phase loses no diode voltage drops.

While the present invention has been described in an idealized condition, the resistance in the motor (R1, R2, R3) in series with the peak BEMF will reduce the voltage that can be maintained at VM by an amount proportional to the current drawn by the load. Also, the voltage at the high voltage terminal is not constant, but varies over the 120° interval. The amount of variation and the exact shape of the waveform depend on the internal construction of the motor.

Although the present invention has been described with reference to preferred embodiments, workers skilled in the art will recognize that changes may be made in form and detail without departing from the spirit and scope of the invention.

We claim:

1. In a circuit for operating a first motor having at least three stator coils connected to a center tap, the circuit including first and second nodes for connection to a source of DC voltage;

a second motor connected between the first and second nodes and operable by the source of DC voltage;

a commutator comprising:
at least three pairs of switches, each pair comprising an upper switch and a lower switch, each switch including a control element and first and second controlled elements, the first controlled elements of the switches of each pair being connected together and to a respective one of the stator coils, the second controlled element of the switches of each pair being connected a respective one of the first and second nodes; and a sequencer connected to the control elements of all of the switches, the sequencer being operable in a first mode to selectively operate the switches to provide power from the source of DC voltage to the three stator coils to operate the first motor to rotate a rotor thereof;

a method of operating the sequencer in a second mode to supply power to the second motor from the rotating first motor during an absence of the source of DC voltage at the nodes comprising:
sensing an absence of the source of DC voltage; and
operating the sequencer in response to the absence of the source of DC voltage to selectively operate the switches of the pairs to selectively serially short-circuit two of the stator coils so that back emf from the stator coils while the rotor is rotating is provided to the first and second nodes to supply power to the second motor.

2. The invention of claim 1, including operating the sequencer so that the switches provide power from the source of DC voltage by operating the respective upper switches in sequence so that each upper switch connects the respective stator coil to the first node during an exclusive 120° rotation of the rotor, and by operating the respective lower switches in sequence so that each lower switch connects the respective stator coil to the second node during an exclusive 120° rotation of the rotor, the sequence of operation of the lower switches being offset from the sequence of operation of the upper switches by 60°.

3. The invention of claim 1, wherein the circuit includes a phase detector for detecting a rotational phase of the rotor, and including operating the sequencer in response to absence of the source of DC voltage at the nodes to operate the lower switches so that the two lower switches associated with the stator coils having the highest and lowest voltages connect their respective stator coils to the second node during a first portion of the respective 60° rotational phase of the rotor, whereby the two stator coils having the highest and lowest voltages are serially short-circuited to the second node during the 60° rotational phase.

4. The invention of claim 3, wherein the circuit includes a storage device connected between the first and second nodes for storing a charge to operate the second motor, and including operating the sequencer so that none of the switches connect their respective stator coils to either the first or second node during a second portion of the respective 60° rotational phase, whereby the storage device is charged through inherent diodes of two commutator switches during the second portion of the 60° rotational phase.

5. The invention of claim 4, including charging the storage device through the inherent diode of the upper switch associated with the coil having the highest voltage and the inherent diode of the lower switch associated with the coil having the lowest voltage.

6. The invention of claim 3, wherein the circuit includes a storage device connected between the first and second nodes for storing a charge to operate the second motor, including operating the sequencer so that the upper switch associated with the stator coil having the highest voltage connects the associated stator coil to the first node and the lower switch associated with the stator coil having the lowest voltage connects the associated stator coil to the second node during a second portion of the respective 60° rotational phase, whereby the storage device is charged through the connecting upper and lower switches during the second portion of the 60° rotational phase.

7. The invention of claim 1, wherein the circuit includes a phase detector for detecting a rotational phase of the rotor and a storage device connected between the first and second nodes for storing a charge to operate the second motor,
  including operating the sequencer in response to absence of the source of DC voltage at the nodes so that
    the lower switch associated with the stator coil having the lowest voltage is operated for an exclusive 120° rotational period of the rotor that the associated stator coil has the lowest voltage to connect the stator coil having the lowest voltage to the second node for the 120° period, and
    the other lower switches are operated during a first portion of mutually exclusive 60° rotational phases of the rotor during the 120° period that the associated coil has the highest voltage to connect the associated stator coil to the second node for the first portion of the respective 60° phase,
  whereby the two stator coils having the highest and lowest voltages are serially short-circuited to the second node during each 60° rotational phase, and
  operating the sequencer so that the upper switch associated with the stator coil having the highest voltage connects the associated stator coil to the first node and the lower switch associated with the stator coil having the lowest voltage connects the associated stator coil to the second node during a second portion of each respective 60° rotational phase, whereby the storage device is charged through the connecting upper and lower switches during the second portion of each 60° rotational phase.

8. The invention of claim 1, including operating the sequencer in response to absence of the source of DC voltage at the nodes to operate the lower switches in sequence whereby
  a. during a first 60° rotation of the rotor, the lower switches of the first and second pairs are operated;
  b. during a second 60° rotation of the rotor, the lower switches of the first and third pairs are operated;
  c. during a third 60° rotation of the rotor, the lower switches of the second and third pairs are operated;
  d. during a fourth 60° rotation of the rotor, the lower switches of the first and second pairs are operated;
  e. during a fifth 60° rotation of the rotor, the lower switches of the first and third pairs are operated; and
  f. during a sixth 60° rotation of the rotor, the lower switches of the second and third pairs are operated.

9. A system for supplying power to first and second motors, the first motor having at least three stator coils connected to a center tap, the system comprising:
  first and second nodes for connection to a source of DC voltage, the second motor connected between the first and second nodes and operable by the source of DC voltage;
  a commutator circuit for operating the first motor, the commutator comprising:
    at least three pairs of switches, each switch including a control element and first and second controlled elements, the first controlled elements of the switches of each pair being connected together and to a respective one of the stator coils, the second controlled element of an upper switch of each pair of switches being connected to the first node, and the second controlled element of a lower switch of each pair of switches being connected to the second node; and
  a sequencer connected to the control elements of all of the switches,
    the sequencer being responsive to the presence of the source of DC voltage at the first and second node to selectively operate the switches to provide power from the source of DC voltage to the three stator coils to operate the first motor to rotate a rotor thereof,
    the sequencer being responsive to absence of the source of DC voltage at the nodes to selectively operate the switches of the pairs of switches to selectively short-circuit two of the stator coils so that back emf from the stator coils while the rotor is rotating is provided to the first and second nodes to supply power to the second motor.

10. The system of claim 9, including
  a storage capacitor coupled between the first and second nodes for storing voltage to operate the second motor, and
  a charge circuit connected to the sequencer to operate the sequencer in a first mode to short circuit two of the stator coils having highest and lowest voltages during a first portion of a 60° phase of the first motor, and the charge circuit operates the sequencer to a second mode during a second portion of the 60° phase to charge the capacitor from energy stored in the stator coils that were short circuited in the first mode.

11. The system of claim 10, including a current sensor connected between the storage capacitor and one of the first and second nodes, the charge circuit being responsive to the sensor sensing current below a predetermined threshold when the sequencer is in its second mode to operate the sequencer to its first mode.

12. The system of claim 10, wherein each switch of the commutator has a diode function, the sequencer is operated in its second mode to operate all of the switches so that current from the stator coil having the highest voltage flows through the diode of its associated upper switch to the first node and current flows from the second node to the stator coil having the lowest voltage through the diode of its associated lower switch.

13. The system of claim 12, including a current sensor connected between the storage capacitor and one of the first and second nodes to sense current flowing between the first and second nodes, the charge circuit being responsive to the sensor sensing current below a predetermined threshold when the sequencer is in its second mode to operate the sequencer to its first mode.

14. The system of claim 10, wherein the sequencer is operated in its second mode to operate the switches so that current from the stator coil having the highest voltage flows through the associated upper switch to the first node and current flows from the second node to the stator coil having the lowest voltage through the associated lower switch.

15. A three-phase generator boost circuit for supplying power to a second motor upon catastrophic loss of power to a three phase motor, comprising:

first and second nodes for connection to a DC source, the second motor being connected to the nodes for receiving power from the nodes;

a storage capacitor coupled between the first and second nodes for storing energy for the second motor;

a commutator connected to the nodes for supplying power from a source to stator coils of the three-phase motor, the commutator being operable to supply power from the motor to the nodes during an absence of the DC source and while the motor is rotating, the commutator consisting essentially of:

at least three pairs of semiconductor switches, each switch including a control element and first and second controlled elements, the first controlled elements of the switches of each pair being connected together and to a respective one of the stator coils, the second controlled element of an upper switch of each pair of switches being connected to the first node, and the second controlled element of a lower switch of each pair of switches being connected to the second node; and a sequencer connected to the control elements of all of the switches, the sequencer being operable to selectively operate the switches to provide power from the source of DC voltage to the three stator coils to operate the first motor to rotate a rotor thereof, and being operable to selectively operate the switches to selectively serially short-circuit two of the stator coils so that back emf from the stator coils while the rotor is rotating is provided to the first and second nodes to supply power to the second motor.

16. The circuit of claim 15, wherein the sequencer is operable to selectively operate a switch of each of two pairs of switches in sequence to provide power from the source of DC voltage to the three stator coils to operate the first motor to rotate its rotor, and being operable to operate the lower switches to selective serially short-circuit two of the stator coils so that back emf from the stator coils while the rotor is rotating is provided to the first and second nodes to supply power to the second motor.

17. The circuit of claim 16, wherein the sequencer is operable to selectively operate the upper switches in sequence to provide power from the source of DC voltage to the three stator coils to operate the first motor to rotate its rotor.

18. The circuit of claim 16, wherein the sequencer operates the switches during successive 60° phases of the first motor to serially short circuit two of the stator coils through two lower switches during a first mode of each phase and to discharge energy stored in the stator coils to the capacitor during a second mode of the phase.

19. The circuit of claim 18, including a current sensor coupled between the first and second nodes and responsive to current flowing between the nodes, and a charge circuit responsive to the sensor sensing current below a predetermined threshold when the sequencer is in its second mode to operate the sequencer to the first mode.

20. For a sequencer that operates a commutator of a three-phase motor in a first mode to provide power from a DC supply connected to a pair of nodes to successive stator coils of the motor to rotate a rotor of the motor, a method of operating the sequencer in a second mode so that back emf from the motor provides power to the pair of nodes, the method comprising:

detecting an absence of DC supply voltage to the nodes; and operating the commutator in a first manner to selectively serially short-circuit two stator coils during a first portion of successive 60° phases of the motor while the rotor is rotating; and operating the commutator in a second manner during the respective 60° phase so that back emf from the stator coils is provided to the nodes.

21. The method of claim 20, wherein the commutator has at least three pairs of switches, each pair comprising an upper switch and a lower switch, each switch including a control element coupled to the sequencer and first and second controlled elements, the first controlled elements of the switches of each pair being connected together and to a respective one of the stator coils, the second controlled element of the switches of each pair being connected a respective one of the pair of nodes, the step of operating the sequencer in the first manner comprises operating a lower switch of the two pairs associated with the stator coils having the highest and lowest voltages to serially short-circuit the stator coils through one of the nodes.

22. The method of claim 21, wherein each of the switches has an inherent diode function, the step of operating the sequencer in the second manner comprises rendering all of the switches non-conductive and discharging back emf as a current from one of the stator coils that was short-circuited when the sequencer was operated in the first manner through the inherent diode of the respective upper switch to one of the nodes and from the other of the nodes through the inherent diode of the lower switch associated with the other of the stator coils that was short-circuit when the sequencer was operated in the first manner, to thereby charge a storage device connected between the nodes.

23. The method of claim 22, including sensing the current between the nodes during operation of the sequencer in the second manner and operating the sequencer to the first manner if the sensed current is below a threshold.

24. The method of claim 21, wherein the step of operating the sequencer in the second manner comprises operating the upper switch associated with the stator coil having the highest voltage and the lower switch associated with the stator coil having the lowest voltage to discharge back emf as a current from the stator coil having the highest voltage through the respective upper switch to one of the nodes and from the other of the nodes through the lower switch associated with the stator coil having the lowest voltage, to thereby charge a storage device connected between the nodes.

25. The method of claim 24, including sensing the current between the nodes during operation of the sequencer in the second manner and operating the sequencer to the first manner if the sensed current is below a threshold.

* * * * *